(12) United States Patent
Lee et al.

(10) Patent No.: US 6,602,457 B1
(45) Date of Patent: Aug. 5, 2003

(54) PROCESS OF MAKING HIGH DIELECTRIC NON-WOVEN FABRICS

(75) Inventors: Choong-Joong Lee, Seoul (KR); Soon-Kyu Chung, Kyungki-do (KR); Jin-Soo Joo, Seoul (KR)

(73) Assignee: Clean Air Technology Co. (KR)

( * ) Notice: Subject to any disclaimer, the term of this patent is extended or adjusted under 35 U.S.C. 154(b) by 247 days.

(21) Appl. No.: 09/656,646

(22) Filed: Sep. 7, 2000

(30) Foreign Application Priority Data

| Sep. 16, 1999 | (KR) | 1999-39918 |
| Jun. 27, 2000 | (KR) | 2000-35672 |
| Aug. 4, 2000 | (KR) | 2000-45161 |

(51) Int. Cl.⁷ .............. D01D 5/28; D01F 1/10; D04H 3/02; H01J 37/30; H05B 6/00
(52) U.S. Cl. ............ 264/469; 264/103; 264/211; 264/470; 264/473
(58) Field of Search ............... 264/103, 211, 264/464, 469, 470, 473

(56) References Cited

U.S. PATENT DOCUMENTS 5,645,627 A  *  7/1997  Lifshutz et al. ............... 96/15

\* cited by examiner

*Primary Examiner*—Leo B. Tentoni
(74) *Attorney, Agent, or Firm*—Fulbright & Jaworski LLP

(57) ABSTRACT

The present invention relates to high dielectric non-woven fabrics and their synthetic process and more particularly, relates to a process for preparing high dielectric non-woven fabrics including the steps of (a) mix-spinning polyvinylidene fluoride (PVDF) and polypropylene (PP) to prepare a fiber, (b) polarizing the fiber prepared in the step (a) to improve the dielectric constant of the fiber, and (c) manufacturing non-woven fabrics from the fiber having improved dielectric constant, prepared in the step (b), and non-woven fabrics prepared according to the mentioned process.

6 Claims, No Drawings

PROCESS OF MAKING HIGH DIELECTRIC NON-WOVEN FABRICS

BACKGROUND OF THE INVENTION (a) Field of the Invention

The present invention relates to high dielectric non-woven fabrics and their synthetic process. Particularly, the present invention relates to non-woven fabrics which have a high-dielectric constant. They have a very improved static electricity retention property compared to the dielectric non-woven fabrics of the prior art. The high dielectric non-woven fabrics can be applied to an electrostatic filter having excellent filtration efficiency of microparticles and ionic particles, and they can be applied to a sweeper having high static electricity retention properties, both having a long life time.

The present invention also relates to an electrostatic filter and sweeper made from the non-woven fabrics mentioned above.

(b) Description of the Related Art

Non-woven fabrics are made directly from fiber without passing a medium of thread. Non-woven fabrics are used in various fields as filters and sweepers, and the properties thereof depend on parameters including the kind and density of fiber used, bonding material, etc.

Non-woven fabrics can be applied to a filter for filtering dust. A filter allows air to permeate but does not allow dust to permeate through fine pores between fibers in non-woven fabrics manufactured from synthetic or natural fiber, and thus the dust is removed from the air.

The efficiency of filtration should be considered. The filter and dust-preventing masks of the prior art mainly employ mechanical filtering. Recently, studies on an electrostatic filter for filtering dust of micro-particles and ionic particles, etc. have been actively performed. However, since the previous filter had a short static electricity retention time, it was not practical.

For the purpose of improving the property of static electricity retention, U.S. Pat. No. 5,645,627 incorporated charges into fibers made from polymers including polypropylene, polyethylene, polyester, polyamide, polyvinyl chloride and polymethyl methylacrylate. However, the improvement in the static electricity retention property was not satisfactory.

Accordingly, there has been a need for non-woven fabrics that can be applied to an electrostatic filter having excellent efficiency of filtration and the capability to retain static electricity.

In addition, non-woven fabrics can be applied to a sweeper. A sweeper preferably has static electricity for cleaning fine material such as dust on computer or TV braun tubes. However, commercially available sweepers have low dielectric constants or short static electricity retention times. Therefore, there is a need for a sweeper having a high dielectric constant and excellent static electricity retention properties.

SUMMARY OF THE INVENTION

It is an object of the present invention to provide non-woven fabrics having a high dielectric constant and a long static electricity retention time.

It is another object of the present invention to provide a process for preparing non-woven fabrics as mentioned above (high dielectric constant and long static electricity retention time).

It is another object of the present invention to provide an electrostatic filter and a sweeper made from non-woven fabrics as mentioned above, that have excellent filtration efficiency for dust of micro-particles and ionic materials, etc., and high static electricity retention properties, and thus, when they are applied to a filter or sweeper, they can sustain their functions for a long period.

DETAILED DESCRIPTION AND THE PREFERRED EMBODIMENTS

In order to achieve the objects mentioned above, the present invention provides a process for preparing high-dielectric non-woven fabrics comprising the steps of (a) mix-spinning polyvinylidene fluoride (PVDF) and polypropylene (PP) to prepare fiber, (b) polarizing the fiber prepared in step (a) to improve the dielectric constant, and (c) manufacturing non-woven fabrics by using the fiber having an improved dielectric constant as prepared in step (b).

The present invention also provides non-woven fabrics prepared according to the process mentioned above.

The present invention also provides an electrostatic filter made from the non-woven fabrics having a high dielectric constant.

The present invention also provides a sweeper made from the non-woven fabrics having a high dielectric constant.

The present invention will be explained in more detail.

The present inventors used polyvinylidene fluoride (PVDF) and polypropylene (PP) having excellent piezoelectric power as a raw material in order to synthesize non-woven fabrics having excellent static electricity retention properties. And they found that, if electrostatic force is added to the fiber of non-woven fabrics, the resultant non-woven fabrics will have remarkably improved static electricity retention properties compared to those of the prior art, and so they completed the present invention.

The process for preparing high-dielectric non-woven fabrics of the present invention comprises the steps of (a) mix-spinning polyvinylidene fluoride (PVDF) and polypropylene (PP) to prepare a fiber, (b) polarizing the mentioned fiber prepared in step (a) to improve the dielectric constant of the fiber, and (c) manufacturing non-woven fabrics from the mentioned high-dielectric fiber prepared in step (b).

In step (a), fiber used in the manufacture of non-woven fabrics is prepared in accordance with a common process for preparing fiber. It is characterized by mix-spinning polyvinylidene fluoride (PVDF) and polypropylene (PP).

The contents of polyvinylidene fluoride (PVDF) and polypropylene (PP) are preferably 1 to 20% by weight and 99 to 80% by weight, respectively. More preferably, the content of polyvinylidene fluoride (PVDF) is 8 to 12% by weight, and most preferably, 10% by weight. In the range of 1 to 20% of polyvinylidene fluoride (PVDF), as the content of polyvinylidene fluoride (PVDF) increases, the efficiency of filtration of the electrostatic filter increases, and at 10% content, the efficiency of filtration is ~100%.

The thickness of the fiber prepared is 5 to 20 $\mu$m, preferably 10 to 14 $\mu$m. As the thickness of the fiber increases, the efficiency of filtration of the electrostatic filter decreases. Within the above range, the efficiency of filtration of the non-woven fabrics is high.

In step (b), the fiber is polarized to improve the dielectric constant. Polyvinylidene fluoride exists in the forms and, and the form has a high electric charge. In this step, the form of polyvinylidene fluoride contained in the fiber changes into the form to impart a high electric charge.

In polarization treatment, an electric beam is scanned on the fiber while repeatedly winding/unwinding/rewinding the fiber, and in the scanned area, the distribution of the electrons in the molecules of high-dielectric fiber in non-woven fabrics is polarized by the influence of the electric beam with a high-electric charge. This process will be easily understood by those skilled in the art.

In step (c), non-woven fabrics are manufactured from the high-dielectric fiber prepared in step (b). The mentioned high-dielectric fiber alone or together with other common fibers can be manufactured into non-woven fabrics through the common process for preparing non-woven fabrics. Particularly, non-woven fabrics having a suitable structure for a filter can be obtained. Although any common process can be applied to preparing non-woven fabrics, a needle-punching process is preferable. If high-dielectric fiber is mixed with other common fibers, the content of other common fibers is preferably 200 parts by weight per 100 parts by weight of the high-dielectric fiber. If the content of common fibers exceeds 200 parts by weight, the non-woven fabrics prepared will have a low static electricity retention property.

In step (c), the density of the fiber is not specifically limited. However, considering the efficiency of filtration of the electrostatic filter and the economic aspect, the density of the fiber is preferably 30 to 600 g/m², more preferably 100 to 300 g/m², and the maximal condition is 250 to 300 g/m².

In addition, the process for preparing high-dielectric non-woven fabrics of the present invention may further comprise the step of plasma treating, corona discharging or ion beam treating the non-woven fabrics prepared in step (c), after step (c). Plasma treatment is preferably conducted under an oxygen atmosphere, at 100 KW and 1 torr, by the common process. In addition, the corona discharge or ion beam treatment can by conducted by the common process. Such plasma treatment, corona discharge or ion beam treatment can increase the electrostatic force of the fiber by 20 to 50%. Moreover, the process for preparing high-dielectric non-woven fabrics of the present invention can further comprise an antibacterial treatment step. Any common method of antibacterial treatment can be applied to the mentioned high dielectric non-woven fabrics. An appropriate amount of inorganic antibacterial compound can be applied during mix-spinning the polyvinylidene fluoride (PVDF) and polypropylene (PP).

The non-woven fabrics prepared in accordance with the present invention have a high dielectric constant and long static electricity retention time. The dielectric constant of the non-woven fabrics prepared according to the present invention was measured to be 3.59, an excellent value (Example 1). The dielectric constant was measured by inserting non-woven fabrics between two parallel plates spaced apart by a certain distance and measuring the electric forces with or without non-woven fabrics. The dielectric constant was calculated using the following equation.

$$E=E^0/K$$

Wherein E indicates an electric field in the presence of a dielectric body, $E^0$ indicates an electric field in the absence of a dielectric body, and K indicates a dielectric constant.

In addition, the present invention provides an electrostatic filter made from said non-woven fabrics. The process for preparing a non-woven fabric electrostatic filter is carried out by a common process for preparing filters from non-woven fabrics. The electrostatic filter of the present invention is preferably applied to a dust-preventing mask, air filter or electrostatic filter on a vacuum cleaner. The electrostatic filter of the present invention has remarkably improved filtration efficiency compared to the filter of the prior art since it has excellent electrostatic force. In addition, the electrostatic filter of the prior art has the problem that the electrostatic force thereof significantly decreases by uses of only several times. However, the electrostatic force of the electrostatic filter of the present invention is maintained at a level similar to that of at the beginning despite several tens of uses, since it has a long static electricity retention time.

In addition, the present invention provides a sweeper made from said high dielectric non-woven fabrics. The sweeper of the present invention is prepared by a common process such as cutting non-woven fabrics into a suitable size. The sweeper of the present invention has excellent cleaning efficiency since it has a high electrostatic force, and has a remarkably prolonged life time compared to the sweeper of the prior art since it has a long static electricity retention period.

The present invention will be explained in more detail in reference to the following examples. However, the following examples are to illustrate the present invention and the present invention is not limited to them.

EXAMPLE 1

Fiber having a thickness of 10 μm was obtained by mix-spinning 10% by weight of polyvinylidene fluoride and 90% by weight of polypropylene. Said fiber was polarized At by scanning electronic beams thereto while repeatedly winding/unwinding/rewinding them to prepare fiber having an improved dielectric constant. Said fiber having improved dielectric constant was manufactured to be high dielectric non-woven fabrics by needle punching while controlling the density thereof to 250 g/m².

EXAMPLE 2

The high dielectric non-woven fabrics of the present invention were prepared by the same manner as described in Example 1 except that it was done by mix-spinning 5% by weight of polyvinylidene fluoride and 95% by weight of polypropylene.

EXAMPLE 3

The high dielectric non-woven fabrics of the present invention were prepared by the same manner as described in Example 1 except that it was done by mix-spinning 15% by weight of polyvinylidene fluoride and 85% by weight of polypropylene.

EXAMPLE 4

The high dielectric non-woven fabrics of the present invention were prepared by the same manner as described in Example 1 except that it was done by mix-spinning 10% by weight of polyvinylidene fluoride and 90% by weight of polypropylene to obtain a fiber having a thickness of 5 μm.

EXAMPLE 5

The high dielectric non-woven fabrics of the present invention were prepared by the same manner as described in Example 1 except that it was done by mix-spinning 10% by weight of polyvinylidene fluoride and 90% by weight of polypropylene to obtain a fiber having a thickness of 15 μm.

EXAMPLE 6

The high dielectric non-woven fabrics were prepared by the same manner as described in Example 1 except that it was done by controlling the density of the fiber to 100 g/m².

EXAMPLE 7

The high dielectric non-woven fabrics were prepared by the same manner as described in Example 1 except that it was done by controlling the density of the fiber to 300 g/m$^2$.

EXAMPLE 8

Fiber having thickness of 10 μm was obtained by mix-spinning 10% by weight of polyvinylidene fluoride and 90% by weight of polypropylene. Said fiber was polarized by scanning electronic beams thereto while repeatedly winding/unwinding/rewinding them to prepare a fiber having an improved dielectric constant. 100 parts by weight of said fiber having an improved dielectric constant and 100 part by weight of nylon fiber were mixed and manufactured to high dielectric non-woven fabrics by needle punching while controlling the density thereof to 250 g/m$^2$.

EXAMPLE 9

Non-woven fabrics prepared in Example 6 were plasma treated at atmospheric pressure to prepare high dielectric non-woven fabrics.

COMPARATIVE EXAMPLE 1

Fiber was prepared from polypropylene alone. Said fiber was manufactured into non-woven fabrics by the same manner as described in Example 1.

Experiment 1

In order to test the efficiency of filtration of ionic particles of high dielectric non-woven fabrics prepared in accordance with the present invention, the non-woven fabrics were filtrated by using an aerosol method.

The NaCl aerosol method was conducted by pressurizing and elevating the temperature of a 1% NaCl solution to disperse it in the form of aerosol with 0.3 μm of mean size in the air, passing it through the filter to be tested at 34 liter/min fluid velocity, and measuring the amount of NaCl remained after passing the filter, to indicate the filtration efficiency in percent (%). From this test, the efficiency of filtration of non-woven fabrics presented in Example 1, Example 6, Example 9 and Comparative Example 1 were measured. The efficiencies of filtration of the non-woven fabrics of Examples 1, 6 and 9 were 99.7%, 70% and 99.0%, respectively. To the contrary, the efficiency of filtration of non-woven fabric of Comparative Example 1 was nearly 0%. These results shows that the non-woven fabrics according to the present invention have excellent filtration efficiency against ionic particles and that plasma treatment further improves the efficiency of filtration.

Experiment 2

In order to test the performance of the non-woven fabrics as an electrostatic sweeper according to the present invention, we cleaned computer monitors using the non-woven fabrics of Example 1 and Comparative Example 1. The non-woven fabrics of Example 1 according to the present invention showed excellent cleaning effects compared to that of the non-woven fabrics of Comparative Example 1. In addition, in order to examine the reusability of non-woven fabrics, non-woven fabrics of Example 1 and Comparative Example 1 were used once, cleaned with water, dried and used again to clean computer monitors. The non-woven fabrics of Example 1 according to the present invention, when they were reused, showed similar cleaning effects to unused non-woven fabrics. However, those of Comparative Example 1 showed a significant decrease of dust-capturing performance when they were reused. These results shows that the electrostatic sweeper made from non-woven fabrics according to the present invention has the capability of excellent dust-capturing compared to that of the electrostatic sweeper of the prior art. The results also imply that the presented electrostatic sweeper made from non-woven fabrics based on the present invention has an improved life time compared to that of the electrostatic sweeper of the prior art since, even if reused, it maintains it's performance at a similar level to an unused one.

As mentioned above, high-dielectric non-woven fabrics based upon the present invention have excellent static electricity retention properties. And, the electrostatic filter made from those non-woven fabrics has excellent filtration efficiency against ionic particles compared to that of a conventional filter, and it sustains its function as a filter for a long time. In addition, the sweeper made from the non-woven fabrics according to the present invention has excellent static electricity retention properties and cleaning effects, and has an extended life time.

What is claimed is:

1. A process for preparing high dielectric non-woven fabrics comprising the steps of
   (a) mix-spinning polyvinylidene fluoride (PVDF) and polypropylene (PP) to prepare fiber;
   (b) polarizing the mentioned fiber prepared in the step (a) to enhance the dielectric constant of the fiber; and
   (c) manufacturing non-woven fabrics from the fiber having an improved dielectric constant prepared in the step (b).

2. A process for preparing high dielectric non-woven fabrics according to claim 1, wherein, in the step (a), the contents of polyvinylidene fluoride is 1 to 20wt % by weight and the contents of polypropylene is 99 to 80 wt %.

3. A process for preparing high dielectric non-woven fabrics according to claim 1, wherein the thickness of the fiber prepared in the step (a) is 5 to 20 μm.

4. A process for preparing high dielectric non-woven fabrics according to claim 1, wherein the density of the non-woven fabrics prepared in the step (c) is 30 to 600 g/m$^2$.

5. A process for preparing high dielectric non-woven fabrics according to claim 1 further comprising the step of plasma treating, corona discharging or ion beam treating the non-woven fabrics prepared in the step (c), after step (c).

6. A process for preparing high dielectric non-woven fabrics according to claim 1, wherein inorganic antibacterial compounds are added when mix-spinning in the step (a).

* * * * *